United States Patent [19]

Grysiewicz et al.

[11] Patent Number: 5,758,262
[45] Date of Patent: May 26, 1998

[54] APPARATUS FOR CONVERTING TV AUDIO SIGNALS FOR RECEPTION ON A NEARBY AM AND/OR FM RECEIVER

[75] Inventors: Edward S. Grysiewicz, Menlo Park; Alexander C. Pummer, Pleasanton, both of Calif.

[73] Assignee: Econologic Technologies, Menlo Park, Calif.

[21] Appl. No.: 662,532

[22] Filed: Jun. 13, 1996

Related U.S. Application Data

[62] Division of Ser. No. 642,042, May 6, 1996, which is a continuation of Ser. No. 249,895, May 26, 1994, abandoned.

[51] Int. Cl.⁶ ............................................. H04B 1/00
[52] U.S. Cl. ........................ 455/42; 455/575; 455/90; 455/180.2
[58] Field of Search ......................... 455/180.2, 188.2, 455/197.1, 186.2, 42, 6.3, 66, 74, 77, 82, 575, 95, 90, 83, 141, 142, 143, 144, 92, 93, 94; 348/729, 738, 552; H04N 5/60

[56] References Cited

U.S. PATENT DOCUMENTS

| | | | |
|---|---|---|---|
| 2,528,222 | 12/1950 | Foster | 455/141 |
| 3,259,689 | 7/1966 | Sienkiewcz | 455/41 |
| 4,021,737 | 5/1977 | Trask | 455/41 |

FOREIGN PATENT DOCUMENTS

| | | | |
|---|---|---|---|
| 1337289 | 5/1963 | France | |
| 404010877 | 1/1992 | Japan | H04N 5/60 |

*Primary Examiner*—Reinhard J. Eisenzopf
*Assistant Examiner*—Marsha D. Banks-Harold
*Attorney, Agent, or Firm*—Fliesler, Dubb, Meyer & Lovejoy

[57] ABSTRACT

Apparatus for receiving and transmitting via the airwaves the audio component of a TV channel having a housing. Located in the housing there is provided a circuit located for receiving a plurality of TV channels from the airwaves, each of said TV channels including a video component and an audio component, said receiving circuit including a circuit for selecting the audio component exclusive of said video component from each one of said plurality of TV channels. Also in said housing and coupled to said receiving circuit there is provided a radio frequency transmitting circuit for transmitting a radio frequency carrier comprising said selected audio component via said airwaves.

9 Claims, 4 Drawing Sheets

APPARATUS FOR CONVERTING TV AUDIO SIGNALS FOR RECEPTION ON A NEARBY AM AND/OR FM RECEIVER

This application is a divisional of Ser. No. 08/642,042, filed May 6, 1996, which is a continuation of Ser. No. 08/249,895, filed May 26, 1994, now abandoned.

BACKGROUND OF THE INVENTION

1. Field of the Invention

The present invention relates to apparatus for converting television program audio signals received via the airwaves for transmission via the airwaves to a nearby AM and/or FM receiver.

2. Description of the Related Art

The present invention relates to apparatus for receiving and converting the sound portion of conventional commercial television signals received via the airwaves into signals suitable for transmission via the airwaves for reception by nearby conventional AM and/or FM radio signal receiving apparatus.

Television audio signal converters have heretofore been proposed, illustrative of which are those disclosed in U.S. Pat. No. 4,905,303 which was granted to Johnson, Jr. et al. on Feb. 27, 1990 and U.S. Pat. No. 4,021,737 which was granted to Burdick S. Trask on May 3, 1977.

The earlier Trask patent discloses an apparatus which, when placed near a TV set, detects secondary radiation from the audio IF portion of the television, converts the detected signals to an FM radio signal, and transmits the FM signal for reception by a local radio.

A principle disadvantage of the Trask apparatus is the necessity that it be closely coupled to an operating TV receiver which greatly restricts the range of its usefulness and that in order to change the program that a user desires to listen to it is necessary to change the channel in the TV receiver.

The Johnson, Jr. et al. patent discloses a circuit for receiving an on-air TV signal, and converting the audio portion of the signal into an FM signal which is connected by any suitable connector to the antenna input terminals of a conventional FM receiver.

A principal disadvantage of the apparatus of Johnson, Jr. et al. is that it must be connected by a connector to the antenna terminals of an operable FM receiver thereby requiring special wiring, inconvenient antenna connections and the like. Such requirements necessarily limit the number and type of receivers with which the apparatus can be readily used and consequently significantly restrict the range of its usefulness. Furthermore, Johnson, Jr. et al. do not provide any user operable means for changing the frequency of the signal connectors to the antenna terminals of the FM receiver.

SUMMARY OF THE INVENTION

The apparatus of the present invention is a cross between a television set receiver but without the video, and a low power AM and/or FM radio transmitter. The unit, about the size of a garage door opener, contains all of the state-of-the-art components required to process every on-air television broadcast in a local area. Internally, the unit converts the audio portion of a user selected television channel to an unoccupied user selectable radio station frequency and broadcasts the signal using its own built-in low power transmitter.

This user selected radio frequency, now encoded with television audio information, is received and processed by any nearby, e.g. 10 feet to 15 feet, AM and/or FM radio receiver. The user simply tunes the radio to the frequency that is identical to that transmitted by the unit. All other receiver functions, e.g., volume, base, treble, etc., operate as designed by the radio's manufacturer. For convenience, the apparatus of the present invention is also provided with a means for allowing the user to store and select a limited number, e.g. five, of "favorite" channels.

In addition to receiving and transmitting the primary audio portion of conventional TV signals, an embodiment of the apparatus of the present invention is also capable of receiving and transmitting under user control the secondary audio program (SAP) signals which are carried on one or more audio subcarriers.

The various embodiments of the present invention are usable with all known television standards including NTSC used in the United States and Japan, PAL used in Europe and SECAM used in France.

From the foregoing it can be seen that the apparatus of the present invention provides its user with the opportunity to listen to his or her favorite television entertainment and news programs when there is no television set to watch. The unit will work with any car radio, personal portable headset or pocket radio, tabletop radio, home stereo, or any other similar unit and may be carried or placed in any convenient location, e.g. shirt pocket, clipped to a belt, laid on a table, dashboard of an automobile, or the like. Moreover, the apparatus of the present invention will permit a user to privately listen to a television program while watching the video in cases where the audio of the television set is inaudible or muted.

BRIEF DESCRIPTION OF THE DRAWINGS

The above and other objects, features and advantages of the present invention will become apparent from the following detailed description of the accompanying drawings, in which.

DETAILED DESCRIPTION OF THE INVENTION

Figure 1A:
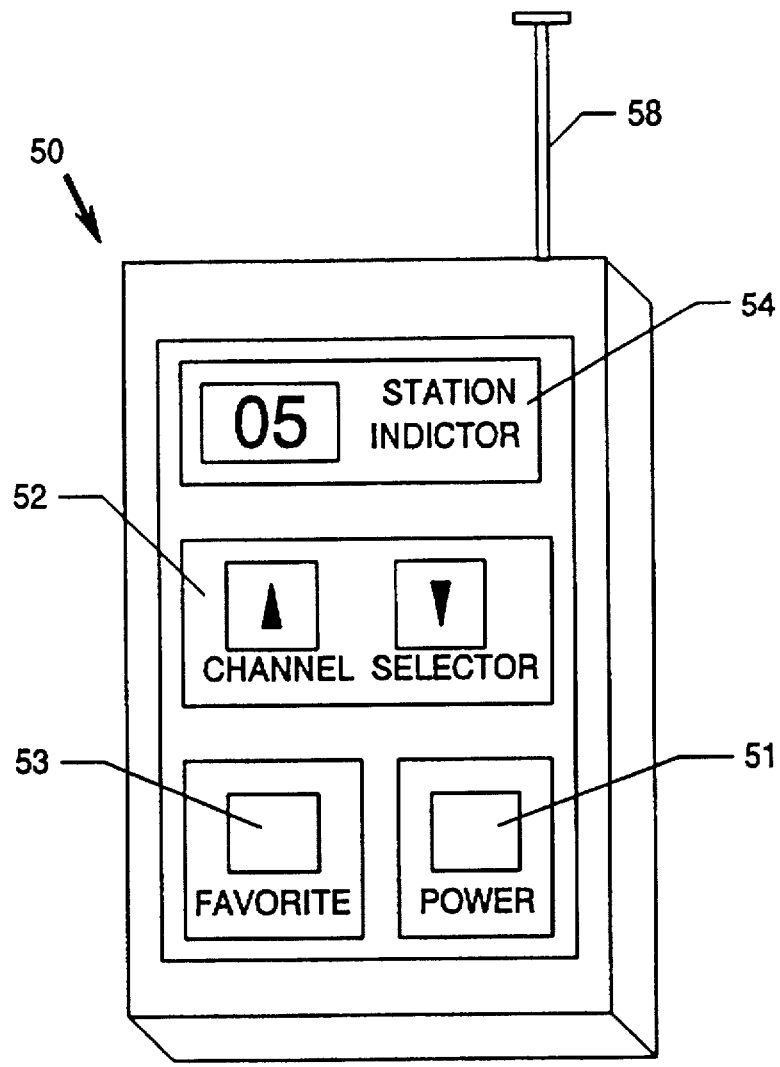
FIGS. 1A and 1B are top and side plan views of an apparatus for converting television audio signals received via the airwaves for transmission via the airwaves and reception on a nearby conventional AM and/or FM radio receiver according to the present invention.
Figure 1B:
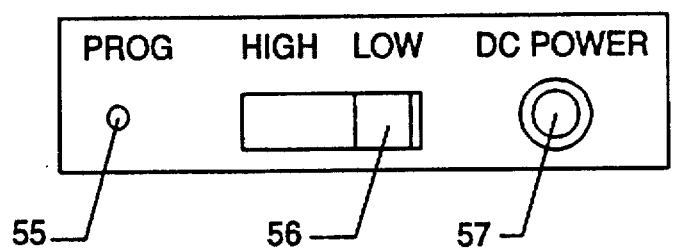

Referring to FIGS. 1A and 1B, there is provided in accordance with the present invention an apparatus designated generally as 50 for converting television audio signals received from the airwaves for transmission via the airwaves and reception on a nearby AM and/or FM receiver. On the front of the apparatus 50 there is provided a power on/off switch 51, an up/down channel selector switch 52 for enabling a user to select one from among all channels in a local area, a favorite channel selector switch 53 for enabling a user to select a limited number of channels, e.g. five, which the user has stored and a station indicator 54 for displaying the television channel which has been selected.

On a side of the apparatus 50 as shown in FIG. 1B there are also provided a programming switch pin hole 55 to enable a user to select a frequency on an AM and/or FM receiver which is also displayed by the station indicator 54, a high/low transmit power switch 56, an external d-c power jack 57 and, in certain embodiments, a SAP switch (not shown) to enable a user to select between primary and secondary audio programs as will be described below.

The apparatus 50 is shown with an antenna 58 partially extended.

Figure 2:
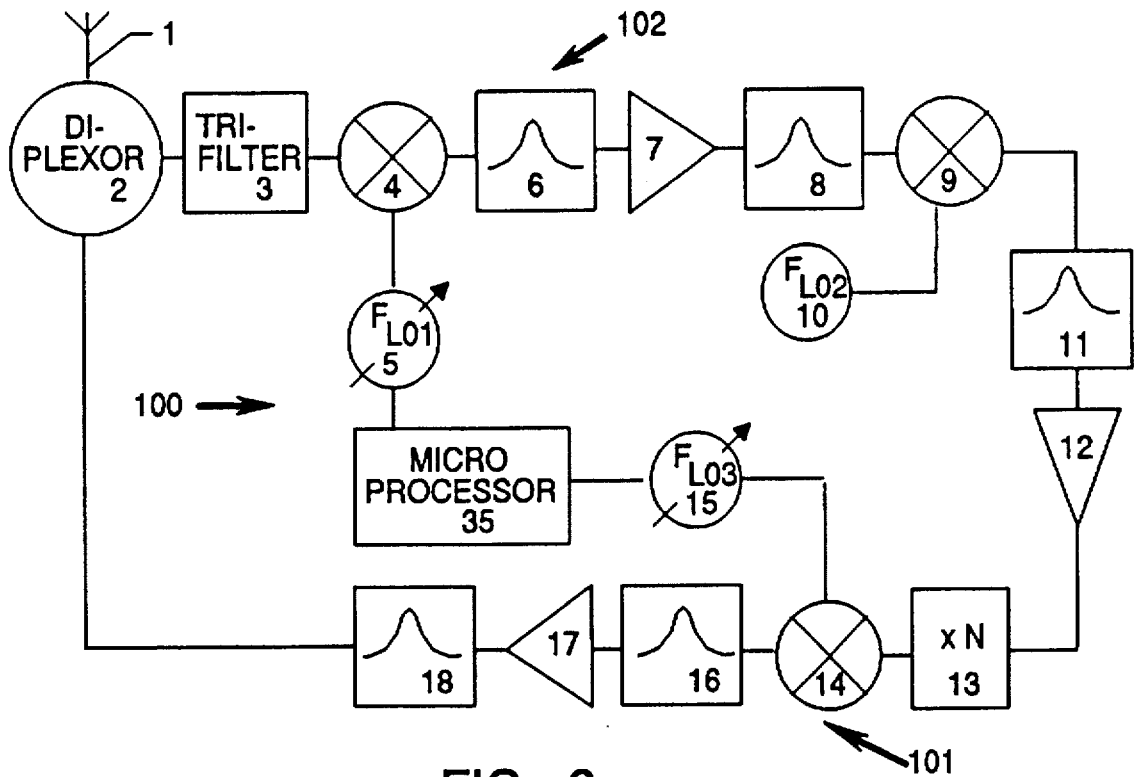
FIG. 2 is a block diagram of an embodiment of the present invention for converting the audio component of television signals comprising NTSC and PAL television standards to an FM output.

Referring to FIG. 2, there is provided in accordance with the present invention an apparatus designated generally as 100 which may be used in the apparatus 50 of FIG. 1 for converting the frequency modulated audio component exclusive of the video component of a television signal received via the airwaves comprising NTSC and PAL television standards to a conventional frequency modulated radio carrier signal and transmitting the frequency modulated carrier signal via the airwaves to a nearby conventional frequency modulated radio signal receiving apparatus.

In the apparatus 100 there is provided an antenna 1 which is common to both the transmitting and receiving sections of the apparatus. The transmitting section is designated generally as 101 and the receiving section is designated generally as 102. Coupled to the antenna 1 there is provided a diplexer 2. The diplexer 2 prevents the output of the transmitter 101 of the apparatus 100 from overlapping the receiver 102 while connecting both the transmitter 101 and the receiver 102 to the antenna 1, as will be further described below. Coupled to an output of the diplexer 2 there is provided a preselection circuit 3. The preselection circuit 3 comprises essentially three bandpass filters for selectively passing the frequencies associated with channel 2–6, channels 7–14 and channels 15–71 and thereby improve the selectivity of the receiver. Coupled to the output of the preselection circuit 3 there is provided a first mixer 4 and a synthesized, user tunable first local oscillator 5 for selecting the audio component of a selected channel exclusive of the video component thereof. The frequency of the input to the first mixer 4 is designated $F_{IN}$. The frequency of the output of the local oscillator 5 is designated $F_{LO1}$. The output of the first mixer 4 comprises a first intermediate frequency $IF_1$, wherein $IF_1 = F_{IN} \pm F_{LO1}$.

Coupled to the output of the mixer 4 there is provided a first intermediate frequency filter 6 having a center frequency $F_{C1}$, wherein $F_{C1} = F_{IN} + F_{LO1}$.

In a preferred embodiment of the present invention, to avoid the requirement for a synchronously tuned input filter, a high $F_{LO1}$, e.g. greater than 800 MHz, and a filter 6 having a bandwidth of 15 MHz and a center frequency $F_{C1}$ of 930 MHz are used to select the higher of the two mixing products to provide a first intermediate frequency $IF_1$, of approximately 930 MHz. The use of a high first intermediate frequency is found to eliminate problems with image frequencies.

Coupled to the output of the IF filter 6 there is provided a first IF amplifier 7. Amplifier 7 is provided to increase the level of the IF signal received from the filter 6 to improve the signal-to-noise ratio and system sensitivity. Coupled to the output of the amplifier 7 there is provided a second intermediate frequency filter 8 having a bandwidth of 300 KHz and a center frequency $F_{C2}$, wherein $F_{C2} = F_{C1}$. Filter 8 is provided to significantly improve the selectivity of the first IF system by increasing the attenuation of the signals outside the passbands of the two filters.

Coupled to the output of the second intermediate frequency filter 8 there is provided a second mixer 9 and a second local oscillator 10 having a frequency $F_{LO2}$ of approximately 923.5 MHz. Mixer 9 and second local oscillator 10 cooperate with the output of the second filter 8 to provide a second intermediate frequency $IF_2$, wherein $IF_2 = IF_1 \pm F_{LO2}$. The second local oscillator 10 comprises a fixed frequency phase lock loop.

Coupled to the output of the mixer 9 there is provided a third intermediate frequency filter 11 having a bandwidth of 300 KHz and a center frequency $F_{C3}$, wherein $F_{C3} = IF_2 - F_{LO2}$, e.g. 6.5 MHz. The second intermediate frequency filter 11 establishes the adjacent channel selectivity of the system.

The output of the filter 11 is coupled to a limiter amplifier 12. The limiter amplifier 12 provides a constant amplitude signal for a frequency multiplier 13 coupled to the output thereof in the transmitter section 101.

The frequency multiplier 13, which increases the frequency of the signal applied thereto by a factor of N, e.g. 2, enhances the signal-to-noise ratio of the television audio channel by carrier frequency (and deviation) multiplication. Coupled to the output of the frequency multiplier 13 there is provided a transmit mixer 14 for providing a third intermediate frequency $IF_3$ and a transmit auxiliary third local user tunable oscillator 15 for providing an output frequency $F_{LO3}$, wherein $IF_3 = N \times F_{C3} \pm F_{LO3}$.

Coupled to the output of the mixer 14 there is provided a fourth intermediate frequency bandpass filter 16 having a frequency $F_{C4}$ in the range of 88 MHz to 108 MHz, depending on the third local oscillator frequency $F_{LO3}$. Coupled to the output of the filter 16 there is provided a transmitter output amplifier 17 for increasing the level of the transmit signal. Coupled to the output of the amplifier 17 there is provided a fifth intermediate frequency filter 18 having a frequency $F_{C5}$ for removing undesired harmonics from the output spectrum, wherein $F_{C5} = F_{C4}$.

In operation, a person using the controls/switches of the apparatus 50 (FIG. 1) controls the microprocessors (μp) 35 to set the frequencies of the local oscillators 5 and 15 thereby selecting the desired channel and the frequency at which the audio will be broadcast to an FM receiver.

Figure 3:
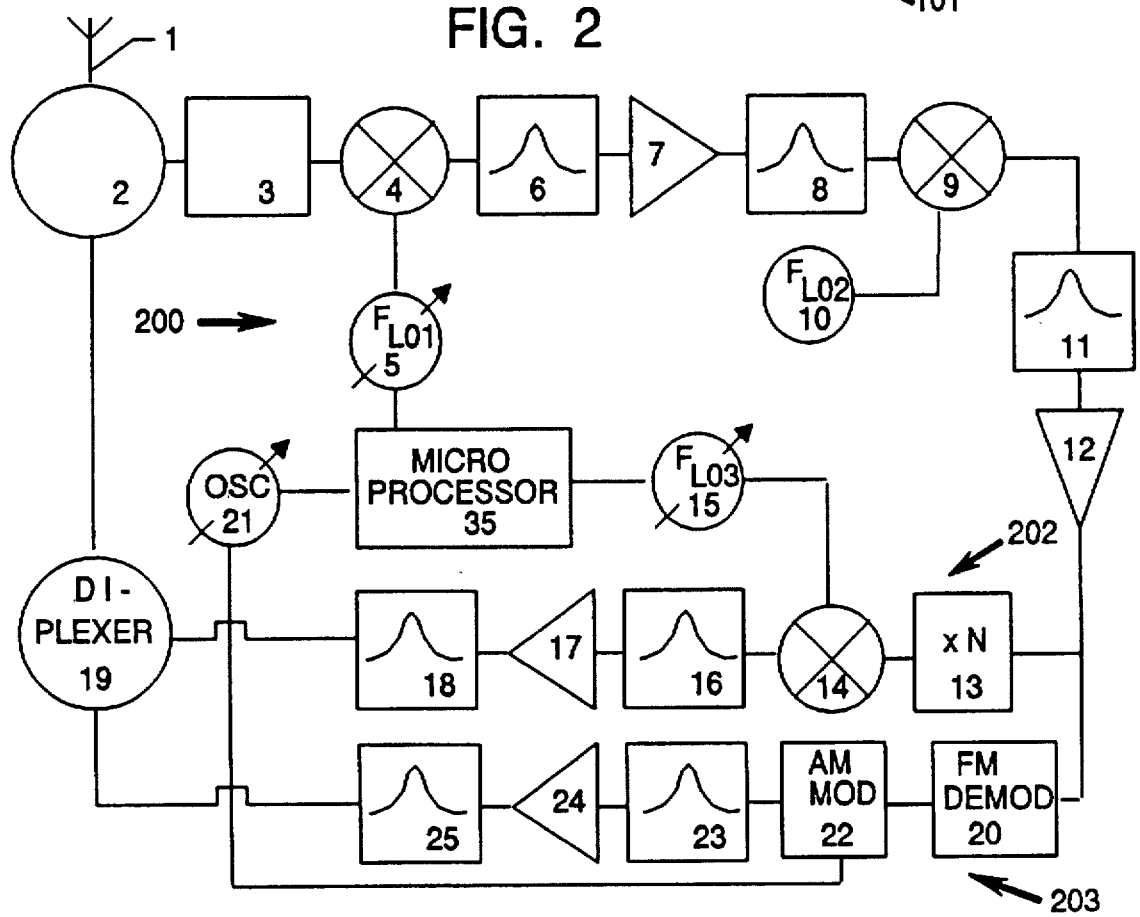
FIG. 3 is a block diagram of another embodiment of the present invention for converting the audio component of television signals comprising NTSC and PAL television standards to either an AM or FM output.

Referring to FIG. 3, there is provided in an alternative embodiment of the present invention an apparatus designated generally as 200 having a receiver section designated generally as 201, an FM transmitter section designated generally as 202 and an AM transmitter section designated generally as 203 for processing television signals comprising NTSC and PAL television standards.

The majority of the components in the apparatus 200 are described above with respect to the apparatus 100 of FIG. 2, are identical in structure and function, and therefore bear the same numerical designation and require no further description. The only additional components not described above with respect to the apparatus of FIG. 2 are components designated 19–25, as hereinafter described.

At the output of the transmitter output filter 18 in the FM transmitter section 202 there is provided an AM/FM diplexer 19. Coupled to the output of the limiter amplifier 12 in the receiver section 201 there is provided an FM demodulator 20. In the AM transmitter section 203 of the apparatus 200 shown at the bottom of FIG. 3, there is provided a user tunable AM transmit oscillator 21 which is tunable over a frequency range of from 1 MHz to 1.7 MHz. One input of an AM modulator 22 is coupled to the oscillator 21 and the other input to an output of the FM demodulator 20. The output of the AM modulator 22 is coupled to a harmonic filter 23 having a bandwidth of 700 KHz from 1.0 MHz to 1.7 MHz and a center frequency $F_{C6}$, e.g. 1300 KHz for suppressing undesired harmonics from the AM modulator 22. The output of the harmonic filter 23 is coupled to an AM output amplifier 24 which is, in turn, coupled to an AM output filter 25 having a bandwidth of 700 KHz and a center frequency $F_{C7}$, wherein $F_{C7}=F_{C6}$. The output of the AM filter 25 is coupled to a second input of the AM/FM diplexer 19 which, as indicated above, has an output coupled to the diplexer 2 leading to the antenna 1 for transmitting either an AM or an FM modulated carrier.

Diplexer 19, like diplexer 2, prevents the overloading of the receiver input with the output from the transmitters using conventional passive circuit elements.

Figure 4:
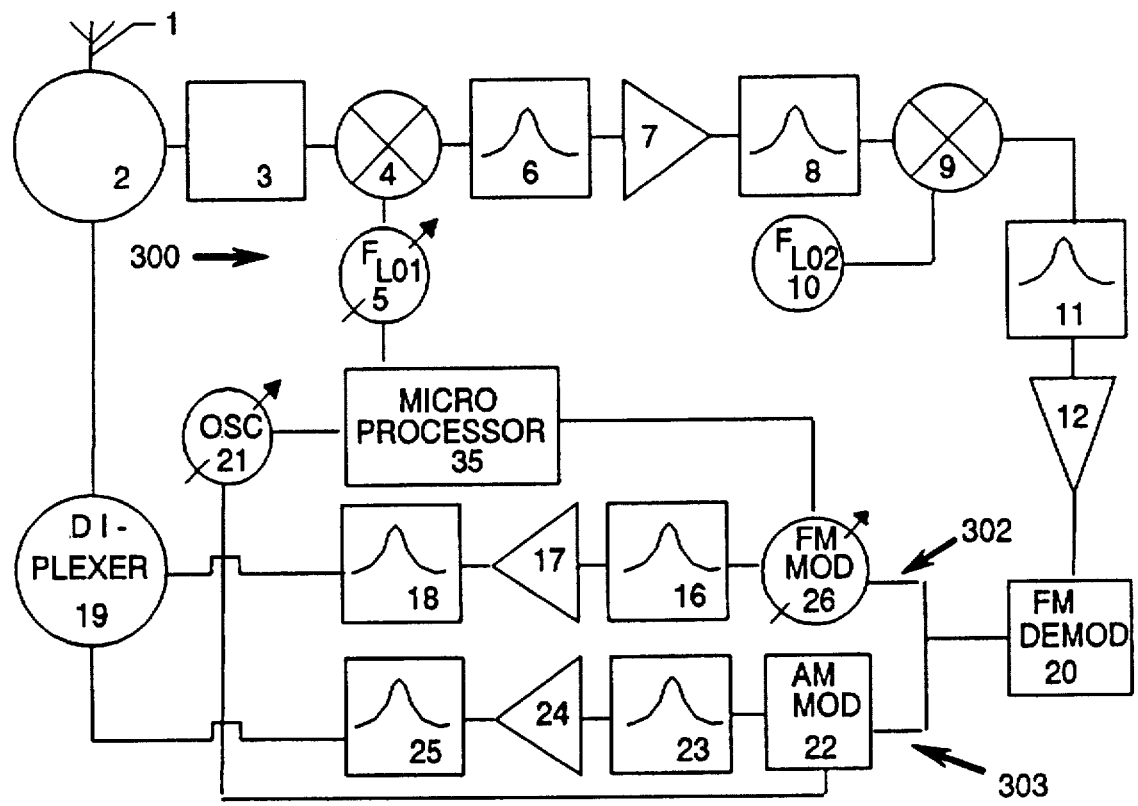
FIG. 4 is a block diagram of still another embodiment of the present invention for converting the audio component of television signals comprising NTSC and PAL television standards to either an AM or FM output.

Referring to FIG. 4, there is provided in still another embodiment of the present invention an apparatus designated generally as 300 having a receiver section designated generally as 301, an FM transmitter section designated generally as 302 and an AM transmitter section designated generally as 303. The apparatus 300 is provided for processing television signals comprising NTSC and PAL television standards The majority of the components in the apparatus 300 are described above with respect to the apparatus 200 of FIG. 3, are identical in structure and function, and therefore bear the same numerical designation and require no further description. The only additional component not described above with respect to the apparatus of FIG. 3 is the component designated 26, as hereinafter described.

In the apparatus 300 the baseband audio signal at the output of the receiver's FM demodulator 20 is available and coupled to both an FM modulator 26 and the AM modulator 22 which are, in turn, coupled to the antenna 1 via the diplexers 19 and 2. The FM modulator 26 comprises a tunable oscillator the nominal center frequency of which is set by the user via the microprocessor 35 and modulated by the output of the FM demodulator 20.

Figure 5:
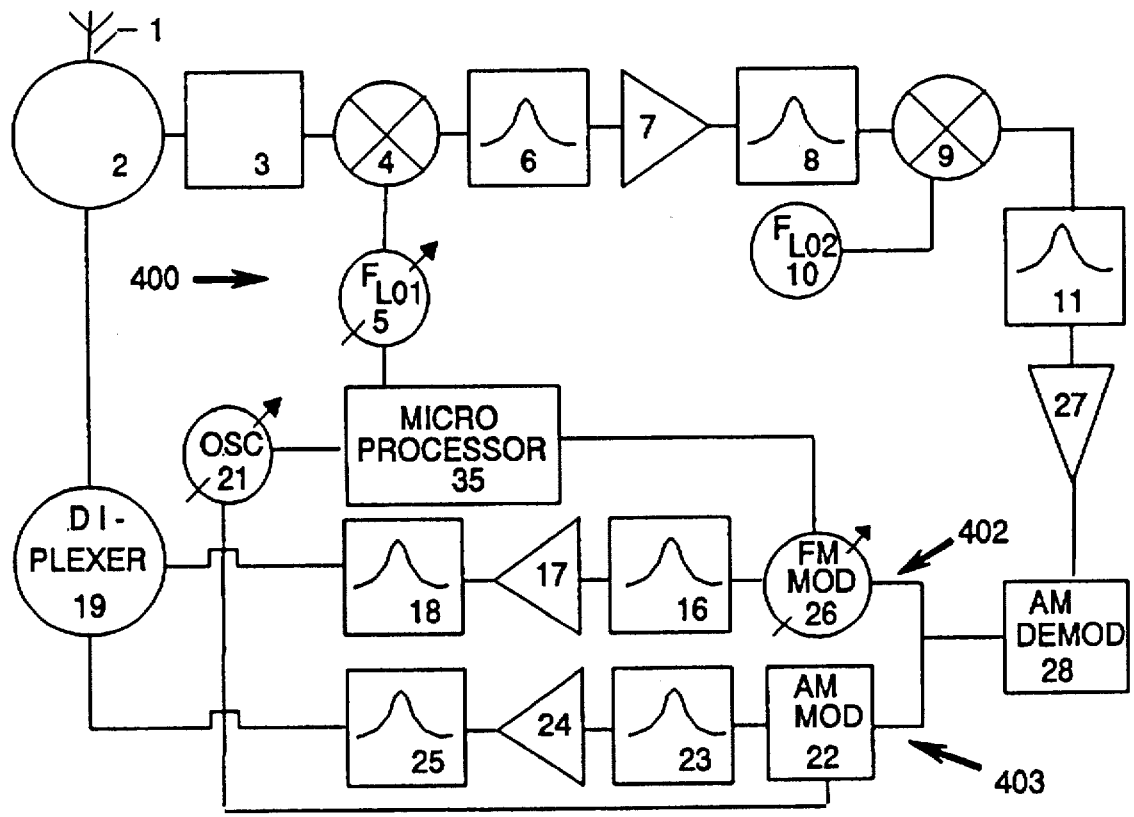
FIG. 5 is a block diagram of still another embodiment of the present invention for converting the audio component of television signals comprising SECAM television standards to either an AM or FM output.

Referring to FIG. 5, there is provided in still another embodiment of the present invention an apparatus designated generally as 400 for processing television signals comprising SECAM television standards. The apparatus 400 of FIG. 5 is identical to the apparatus 300 of FIG. 4 except that the amplifier 12 and demodulator 20 in the receiver section 301 of the apparatus 300 of FIG. 4 is replaced by a gain controlled second IF amplifier 27 and an AM demodulator 28, respectively, for providing via the diplexers 19 and 2 either an AM or an FM modulated carrier signal to the antenna 1.

Conventional television channels comprise a primary audio program component and may comprise one or more secondary audio program (SAP) components. If a television channel carries one or more secondary audio program components, they are carried on a corresponding number of subcarriers in the primary or first audio channel.

Figure 6:
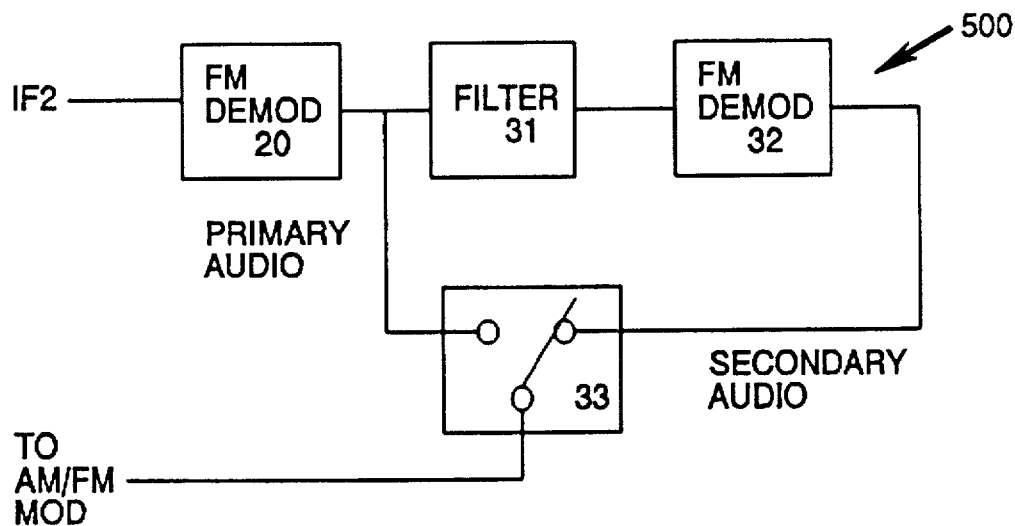
FIG. 6 is a block diagram of a circuit for processing the secondary audio program (SAP) signals of a television channel.
Figure 7:
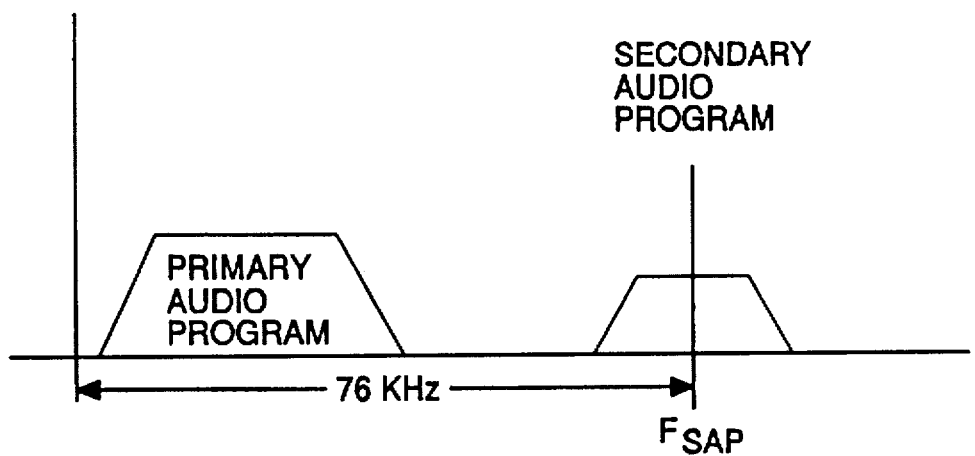
FIG. 7 is a graphical representation of the relationship between the primary and secondary audio portions of a television channel.

Referring to FIGS. 6 and 7, there is provided in accordance with another embodiment of the present invention an apparatus for selectively providing the primary and secondary audio components in a television channel designated generally as 500.

The apparatus 500 is coupled to the output of the FM demodulator 20 described above with respect to the apparatus of FIGS. 3 and 4. In the apparatus 500 there is provided a bandpass filter 31 having a center frequency of approximately 76 KHz. The output of the filter 31 is coupled to a second FM demodulator 32. Coupled to the output of the FM demodulator 20 and the FM demodulator 32 there is provided a switch means 33. The switch means 33 is provided for selectively coupling either the primary audio program component or the secondary audio program component to the AM and/or FM modulators described above with respect to FIGS. 3 and 4.

In practice, the secondary audio program component subcarrier is carried on a subcarrier situated in the first audio channel and has a center frequency which is above the low end of the first audio program component by approximately five times the horizontal deflection frequency, e.g. equal to the desired subcarrier frequency, e.g. 76 KHz.

In each of the above-described embodiments of the present invention a suitably programmed microprocessor 35 and user operable controls, e.g. switches 52 and 53 as shown in FIG. 1, are provided for permitting a user to control the frequency of the various oscillators required to select a particular television channel and an unoccupied frequency in the AM and/or FM radio frequency band. In the case of setting the radio frequency, a control similar to that used for setting a digital watch may be used since it should be necessary to set the frequency only once in any given locale for a long period of time. A small battery is used to store the frequency for the long period of time while larger batteries that may have to be replaced more frequently are used to supply power to the remainder of the apparatus.

While preferred embodiments of the present invention are described above, it is contemplated that numerous modifications may be made thereto for particular applications without departing from the spirit and scope of the present invention. Accordingly, it is intended that the embodiments described be considered only as illustrative of the present invention and that the scope thereof should not be limited thereto but be determined by reference to the claims hereinafter provided.

We claim:

1. A self contained portable apparatus comprising:

a microprocessor for generating a first control signal for selecting a UHF/VHF TV signal from a plurality of UHF/VHF TV signals to be processed by a receiver and a second control signal for selecting a AM and/or FM broadcast radio frequency from a plurality of AM and/or FM broadcast radio frequencies capable of being transmitted by a broadcast means;

said receiver for receiving UHF/VHF TV signals from the airwaves and connected to said microprocessor, said receiver generating an audio output signal from an audio portion of a TV signal selected by said receiver where said TV signal is selected in response to said first control signal generated by said microprocessor;

said broadcasting means connected to said microprocessor for broadcasting over the airwaves a broadcast signal that has been modulated by said audio output signal on a selected AM and/or FM broadcast radio frequency where said selected broadcast radio frequency is selected in response to said second control signal generated by said microprocessor, said broadcasting means having a broadcast range for transmitting said broadcast signal to all radios capable of receiving and tuned to said selected AM/FM broadcast frequency within said broadcast range.

2. The apparatus of claim 1 wherein: said receiver comprises:

a tunable TV tuner for selecting and receiving a UHF/VHF TV signal from the airwaves in response to said first control signal for generating a selected TV signal; and a demodulator for generating said audio output signal from said selected TV signal; and said broadcast means comprises:

a modulator for generating a modulated signal by modulating said audio output signal upon a selected AM or FM radio broadcast frequency where said selected radio broadcast frequency is selected in response to said second control signal; and a transmitter having said broadcast range for transmitting said modulated signal as said broadcast signal.

3. The apparatus of claim 2 further comprising an antenna connected to said tuner in said receiving and an antenna connected to said transmitter in said broadcasting means.

4. The apparatus of claim 2 wherein said modulator comprises:

a FM modulator which is selected and tuned by said second control signal when said desired radio broadcast frequency is from the FM radio broadcast band; and a AM modulator which is selected and tuned by said second control signal when said desired radio broadcast frequency from the AM radio broadcast band.

5. The apparatus of claim 2 wherein said broadcast means comprises:

a FM modulator which is selected and tuned by said microprocessor when said second control signal selects said desired radio broadcast frequency from the FM radio broadcast band; and an AM modulator which is selected and tuned by said microprocessor when said second control signal selects said desired radio broadcast frequency from the AM radio broadcast band.

6. A self contained portable apparatus comprising:

a microprocessor for generating a first control signal for selecting a UHF/VHF TV signal from a plurality of UHF/VHF TV signals to be processed by a receiver and a second control signal for selecting a AM and/or FM broadcast radio frequency from a plurality of AM and/or FM broadcast radio frequencies capable of being transmitted by a broadcast means;

said receiver for receiving UHF/VHF TV signals from the airwaves and connected to said microprocessor, said receiver generating an audio output signal from an audio portion of a TV signal selected by said receiver where said receiver selects said TV signal in response to said first control signal generated by said microprocessor;

said broadcasting means connected to said microprocessor for broadcasting over the airwaves a broadcast signal that has been modulated by said audio output signal on a selected FM broadcast radio frequency where said selected broadcast radio frequency is selected in response to said second control signal generated by said microprocessor, said broadcasting means having a broadcast range for transmitting said broadcast signal to all radios capable of receiving and tuned to said selected FM broadcast frequency within said broadcast range.

7. The apparatus of claim 6 wherein: said receiver comprises:

a tunable TV tuner for selecting and receiving a UHF/VHF TV signal from the airwaves in response to said first control signal for generating a selected TV signal; and a demodulator for generating said audio output signal from said selected TV signal; and said broadcast means comprises:

a modulator for generating a modulated signal by modulating said audio output signal upon a selected FM radio broadcast frequency where said selected radio broadcast frequency is selected in response to said second control signal; and a transmitter having said broadcast range for transmitting said modulated signal as said broadcast signal.

8. A self contained portable apparatus comprising:

a microprocessor for generating a first control signal for selecting a UHF/VHF TV signal from a plurality of UHF/VHF TV signals to be processed by a receiver and a second control signal for selecting a AM and/or FM broadcast radio frequency from a plurality of AM and/or FM broadcast radio frequencies capable of being transmitted by a broadcast means;

said receiver for receiving UHF/VHF TV signals from the airwaves and connected to said microprocessor, said receiver generating an audio output signal from an audio portion of a TV signal selected by said receiver where said receiver selects said TV signal in response to said first control signal generated by said microprocessor;

said broadcasting means connected to said microprocessor for broadcasting over the airwaves a broadcast signal that has been modulated by said audio output signal on a selected AM broadcast radio frequency where said selected broadcast radio frequency is selected in response to said second control signal generated by said microprocessor, said broadcasting means having a broadcast range for transmitting said broadcast signal to all radios capable of receiving and tuned to said selected AM broadcast frequency within said broadcast range.

9. The apparatus of claim 8 wherein: said receiver comprises:

a tunable TV tuner for selecting and receiving a UHF/VHF TV signal from the airwaves in response to said first control signal for generating a selected TV signal; and a demodulator for generating said audio output signal from said selected TV signal; and said broadcast means comprises:

a modulator for generating a modulated signal by modulating said audio output signal upon a selected AM radio broadcast frequency where said selected radio broadcast frequency is selected in response to said second control signal; and a transmitter having said broadcast range for transmitting said modulated signal as said broadcast signal.

\* \* \* \* \*